US012809109B2

(12) United States Patent
Vila et al.

(10) Patent No.: US 12,809,109 B2
(45) Date of Patent: Nov. 24, 2026

(54) SYSTEM AND METHOD FOR INSTALLATION OF CABLES IN AN ELONGATED STRUCTURE

(71) Applicant: LM WIND POWER A/S, Kolding (DK)

(72) Inventors: Marc Vila, Barcelona (ES); Andreas Herrig, Salzbergen (DE)

(73) Assignee: LM Wind Power A/S, Kolding (DK)

( * ) Notice: Subject to any disclaimer, the term of this patent is extended or adjusted under 35 U.S.C. 154(b) by 172 days.

(21) Appl. No.: 17/924,541

(22) PCT Filed: Jul. 2, 2021

(86) PCT No.: PCT/EP2021/068401
§ 371 (c)(1),
(2) Date: Nov. 10, 2022

(87) PCT Pub. No.: WO2022/008388
PCT Pub. Date: Jan. 13, 2022

(65) Prior Publication Data

US 2023/0185048 A1 Jun. 15, 2023

(30) Foreign Application Priority Data

Jul. 8, 2020 (GB) ..................................... 2010478

(51) Int. Cl.

| | |
|---|---|
| ***G02B 6/50*** | (2006.01) |
| ***F03D 1/06*** | (2006.01) |
| *B64F 5/10* | (2017.01) |
| *F03D 17/00* | (2016.01) |

(52) U.S. Cl.
CPC ............ *G02B 6/50* (2013.01); *F03D 1/0675* (2013.01); *B64F 5/10* (2017.01); *F03D 17/00* (2016.05)

(58) Field of Classification Search
CPC . G02B 6/50; B64F 5/10; F03D 1/0675; F03D 17/00
See application file for complete search history.

(56) References Cited

U.S. PATENT DOCUMENTS

| | | |
|---|---|---|
| 8,479,581 B2 | 7/2013 | Herrig et al. |
| 2004/0079929 A1 | 4/2004 | Delaforce et al. |
| 2017/0268486 A1 | 9/2017 | Müller et al. |

FOREIGN PATENT DOCUMENTS

| | | |
|---|---|---|
| JP | 2004229475 A | 8/2004 |

*Primary Examiner* — Nirvana Deonauth
(74) *Attorney, Agent, or Firm* — Dority & Manning, P.A.

(57) ABSTRACT

A method of installing a cable in an elongated structure, wherein the cable includes one or more lines is disclosed. The method includes a) enclosing the one or more lines of the cable using a sheath, b) coupling one end of the sheath to a flexible layer, c) disposing the flexible layer at a defined location at an inner surface of elongated structure, d) creating an access path extending from an outer surface of the elongated structure, opposite to the defined location, and e) extracting at least one of the flexible layer, the one or more lines, and the sheath from inside the elongate structure via the access path. Further, a system for installation of a cable in an elongated structure is also disclosed.

14 Claims, 11 Drawing Sheets

SYSTEM AND METHOD FOR INSTALLATION OF CABLES IN AN ELONGATED STRUCTURE

This is a National Phase Application filed under 35 U.S.C. 371 as a national stage of PCT/EP2021/068401, filed Jul. 2, 2021, an application claiming the benefit of Great Britain Application No. 2010478.2, filed Jul. 8, 2020, the content of each of which is hereby incorporated by reference in its entirety.

BACKGROUND

Embodiments of the present disclosure generally relate to a system and method for installation of cables, specifically it relates to installation of cables in an elongated structure. More particularly, the present disclosure relates to installation of cables in a wind blade to enable connection to a sensing subsystem disposed on an outer surface of the wind blade.

It may be noted that sensors need to be installed on an outer surface of the wind blade for performance validation of the wind blades. These sensors may need to be in communication with associated control and measurement systems via cables. The cables are disposed in an inner cavity of the wind blade. The sensors are connected to these cables by routing the cables disposed in the inner cavity of the wind blade to outside of the wind blade. Typically, connection of cables disposed in the inner cavity of the wind blade to external sensors may be realized via manholes/access panels in the wind blade surface. The manholes/access panels are large holes on the wind blade surface and may in turn impact structural integrity of the wind blade.

The connection of the cable disposed in the inner cavity of the wind blade to the sensor positioned outside the wind blade during manufacturing phase of the wind blade has also been proposed. This might facilitate in having a relatively smaller size hole on the wind blade surface when compared to manholes/access panels. However, positioning sensors outside the wind blade during the manufacturing phase may adversely affect manufacturing lead time. Further, positioning of the sensors outside the wind blade and routing cables to outside of the wind blade may be practically impossible when the wind blade is still in the mould.

Use of wireless sensors instead of wired ones has been also been disclosed. Though wireless sensors avoid the need for making holes in the wind blade surface, the wireless sensors may be expensive and require a sufficiently long-lasting powering system or potentially complex energy harvesting system. These energy harvesting systems may have severe limitations on available power to operate them continuously respectively at a sufficient sampling rate. Accordingly, the wireless sensors may warrant use of additional sources of power such as electrical storage batteries. These electrical storage batteries may supply the required power for only a limited period of time. As a result, the electrical storage batteries may need to be replaced frequently, thereby imposing a significant cost for performance validation of the wind blades. Further, the frequent replacement of the electrical storage batteries results in wind turbine down-time.

BRIEF DESCRIPTION

In accordance with aspects of the present specification, a method of installing a cable in an elongated structure, wherein the cable includes one or more lines is disclosed.

The method includes a) enclosing the one or more lines of the cable using a sheath, b) coupling one end of the sheath to a flexible layer, c) disposing the flexible layer at a defined location at an inner surface of elongated structure, d) creating an access path extending from an outer surface of the elongated structure, opposite to the defined location, and e) extracting at least one of the flexible layer, the one or more lines, and the sheath from inside the elongate structure via the access path.

The proposed arrangement provides the advantage of easy access of the cable from outer surface of the wind blade. Further, the proposed system and method enable accessing of the cable from the outer surface via a narrow access path on body of the wind blade. Thus, need of large manholes or hatches to access the internally disposed cable is avoided.

In a preferred embodiment, the method comprises laying cable along the inner surface of the elongated structure. In a further preferred embodiment, the method comprises removing protection layer of the cable to uncover the one or more lines.

In another preferred embodiment, the method further comprises routing the one or more lines via a protection pipe subsequent to extraction of the one or more lines via the access path and sealing the access path using at least one sealant.

In yet another preferred embodiment, the method further comprises wrapping the sheath using at least one covering sheet.

In a preferred embodiment, wrapping the sheath using the at least one covering sheet comprises disposing at least a first portion of the at least one covering sheet beneath at least a section of the sheath.

In a preferred embodiment, disposing at least the first portion of the at least one covering sheet below at least the section of the sheath comprises adhesively coupling the first portion of the at least one covering sheet to the inner surface of the elongated structure using at least of an adhesive, a tape, and a glue.

In another preferred embodiment, wrapping the sheath using the at least one covering sheet comprises folding a second portion of the at least one covering sheet over at least the section of the sheath, wherein at least the sheath forms a coiled structure proximate to the defined location.

In yet another preferred embodiment, the method further comprises determining at least one of an arc length of the elongated structure and a chord length of the elongated structure from the defined location.

In yet another preferred embodiment, the method further comprises clamping other end of the sheath to the inner surface of the elongated structure.

In a preferred embodiment, steps a), b), and c) are executed during manufacture of the elongated structure and steps d) to e) are executed after manufacture of the elongated structure.

In accordance with another aspect of the present specification, a system for installation of a cable in an elongated structure is presented. The system includes a sheath enclosing one or more lines of a cable. Further, the system includes a flexible layer coupled to one end of the sheath and disposed at a defined location at an inner surface of the elongated structure. Moreover, the system includes a first tool configured to create an access path from an outer surface of the elongated structure opposite to the defined location and a second tool configured to extract at least one of the flexible layer, the sheath, and the one or more lines outside the elongated structure via the access path.

In a preferred embodiment, the cable comprises at least one of a fiber optic cable and a pressure tube.

In another preferred embodiment, the flexible layer is a fabric made of at least one of a nylon layer, a polyethylene layer, polyurethane layer, a polypropylene layer, a cotton layer, a glass layer, or a metal fabric layer.

In another preferred embodiment, the system further comprises at least one covering sheet configured to wrap the sheath.

In a preferred embodiment, the elongated structure is at least one of a wind blade, a pipeline, a structural tube, or an aircraft wing.

In a preferred embodiment, the sheath is at least one of an aramid woven tube, a polymer based tube, or a glass fiber based tube.

In another preferred embodiment, the first tool comprises at least one of a screw, a milling tool, or a drilling tool.

In another preferred embodiment, the second tool comprises at least one of a hook, a slim pair of pliers, pincers, a grabbing tool, or an endoscope.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are active and/or passive and are connected or otherwise coupled together to provide the described function. In addition, the term operatively coupled as used herein includes wired coupling, wireless coupling, electrical coupling, magnetic coupling, radio communication, software based communication, or combinations thereof.

As will be described in detail hereinafter, various embodiments of a method and system for installation of a cable in an elongated structure, where the elongated structure defines an enclosed cavity are disclosed. Specifically, various embodiments of a method and system for installation of a cable in the elongated structure prior to and subsequent to manufacture of the entire structure of the elongated structure, such as a wind blade is disclosed. The cable may be laid in the wind blade prior to the manufacture of the wind blade. Further, the cable may be extracted outside the wind blade subsequent to manufacture of the wind blade and in one embodiment, subsequent to installation of the wind blade on a tower. Although the present specification describes installation of cable in the elongated structure, such as the wind blade, the embodiments as described in the present specification may also be applicable for other elongated structures such as but not limited to aircraft wings, other elongated composite structures, long pipelines, structural tube, and elongated metallic structures.

Figure 1:
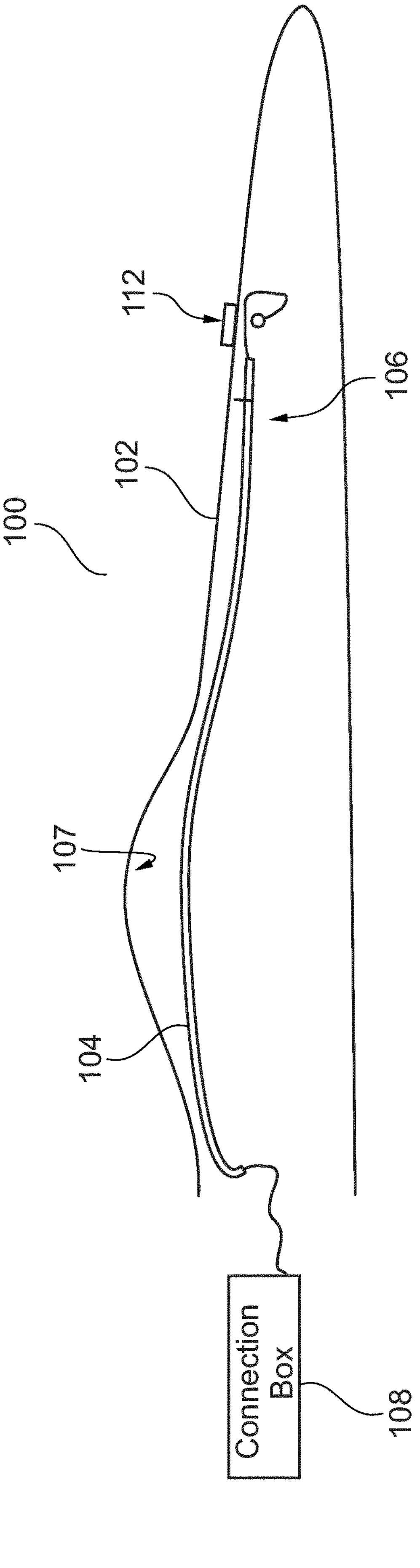
FIG. 1 is a diagrammatical representation of a wind blade with an installed cable.

FIG. 1 is a diagrammatical representation 100 of a wind blade 102 with a cable 104 in accordance with an embodiment of the present specification. In the example of FIG. 1, the wind blade 102 is an elongated structure defining an enclosed cavity 106. The cable 104 is placed in the enclosed cavity 106. In one embodiment, the cable 104 is placed in the enclosed cavity 106 during the manufacture of the wind blade 102. Specifically, the cable 104 is placed along an inner surface 107 of the wind blade 102 before bonding of upwind and downwind shells of the wind blade 102. As will be appreciated, the final structure of the wind blade may be formed by bonding of upwind and downwind shells. In one example, the inner surface 107 is along inner side of the trailing edge of the wind blade 102.

Further one end of the cable 104 may be coupled to connection box 108. The connection box 108 may in turn be coupled to the control subsystem (not shown in FIG. 1). In one embodiment, the connection box 108 may be disposed in at least one of a hub, a nacelle, or a wind turbine tower. The connection box 108 may provide points for connection of cables. In one embodiment, the connection box 108 may include analogue to digital converters. In another embodiment, the connection box 108 includes fiber optic interrogators. In one embodiment, the connection box 108 may be a data acquisition unit.

In accordance with aspects of the present specification, at least a portion of the cable 104 may be extracted outside the wind blade 102. In one example, a portion of the cable 104 may be extracted outside the wind blade 102 after the manufacture of the wind blade 102, specifically after closing of upwind and downwind shells of the wind blade 102. In one example, the cable 104 may be extracted outside the wind blade 102 subsequent to installation of the wind blade 102 on the tower. Further the extracted end of the cable 104 may be coupled to sensing subsystem 112. The sensing subsystem 112 may be disposed on the outer surface of the wind blade 102. The sensing subsystem 112 may include sensors, such as but limited to, pressure sensors, cameras, hot film sensors, hot wire sensors, wall shear sensors, MEMS (micro-electromechanical system) based sensors, LIDAR (Light Detection and Ranging) sensors, distance sensors, and the like. The method of installation of the cable 104 in the wind blade 102 is described with respect to the following figures.

Figure 2:
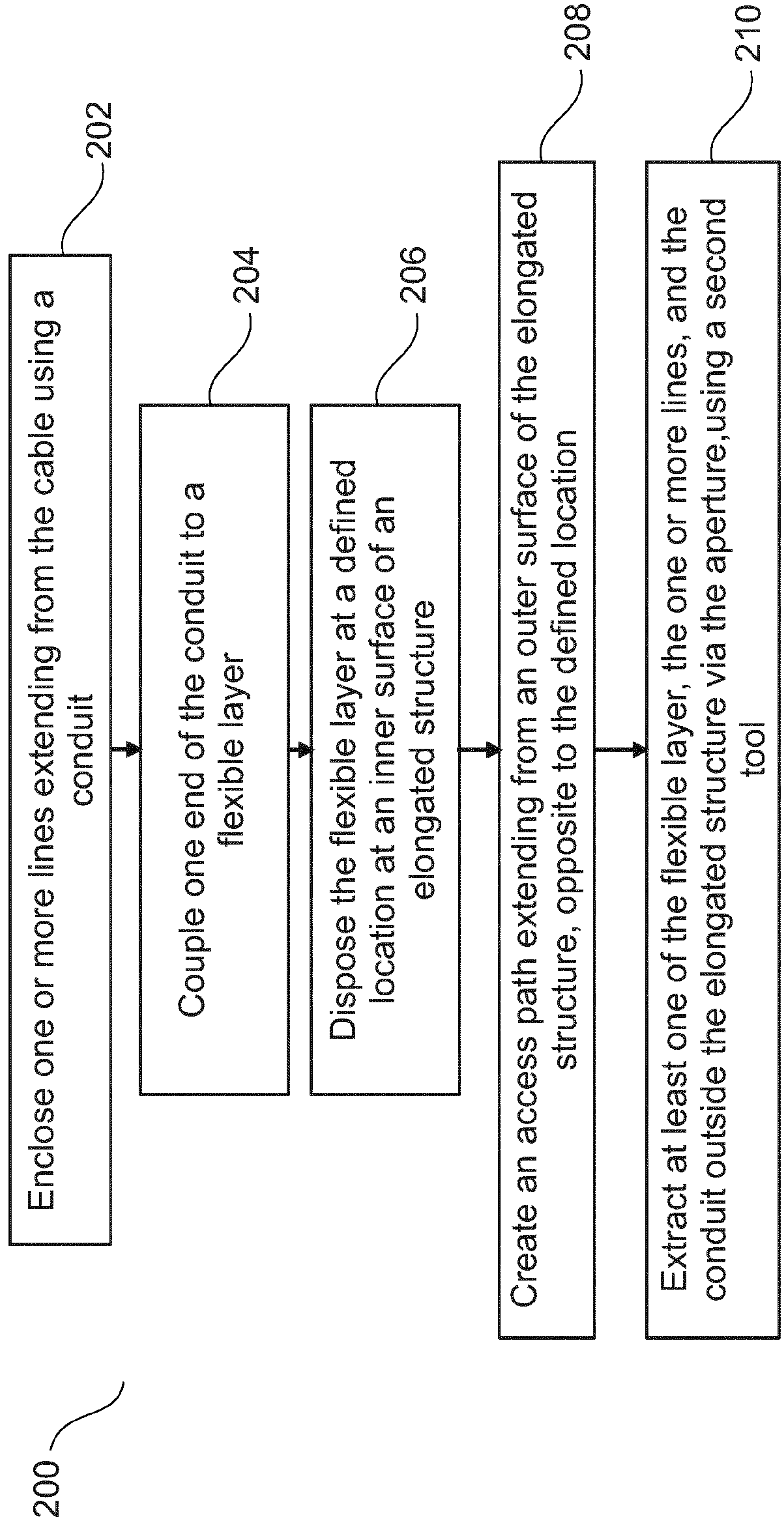
FIG. 2 is a flow chart representation of a method of installing a cable in the wind blade.

Referring now to FIG. 2, a flow chart representation 200 of a method of installing a cable in the wind blade is presented. As noted hereinabove, the cable 104 is disposed along the inner surface 107 of the wind blade 102 during the manufacture of the wind blade 102. Specifically, the cable 104 is disposed before bonding of upwind and downwind shell of the wind blade 102. Subsequently, the cable 104 is extracted outside the wind blade 102 after manufacturing of the wind blade 102, specifically, after closing the upwind shell and the downwind shell of the wind blade 102. Once the cable 104 is extracted outside the wind blade 102, the cable 104 may be coupled to the sensing subsystem 112. The cable 104 may include one or more lines. The one or more lines may be typically covered using an outer protection layer, such as rubber layer. In one embodiment, the cable 104 is a fiber optic cable. In yet another embodiment, the cable 104 may be a pressure tube or a bundle.

At step 202, one or more lines of the cable 104 may be enclosed using a sheath such as a braided fiber tube, a conduit, a casing, or a covering. In one example, the sheath may include a hollow polymer based cylindrical structure. During manufacture of the wind blade 102, the outer protection layer of a section of the cable 104 may be removed. Accordingly, a determined length of the one or more lines of the cable 104 may be uncovered. The uncovered one or more lines may be further enclosed entirely in a sheath. Further, a portion of the sheath extends beyond the length of the one or more lines. Accordingly, one portion of the sheath may include the one or more lines. Further, another portion of the sheath may be unfilled. This portion may be referred to as the unfilled sheath. Specifically, the unfilled sheath does not include the one or more lines.

Further, at step 204, one end of the sheath is coupled to a flexible layer. Specifically, one end of the unfilled sheath may be coupled to the flexible layer. The flexible layer may be a fabric made of at least one of a nylon layer, a polyethylene layer, polyurethane layer, a polypropylene layer, silicon layer, a cotton layer, a glass layer, a metal fabric layer, or other fabric layer.

At step 206, the flexible layer is disposed at a defined location at an inner surface of an elongated structure. The steps 202-206 may be executed while the wind blade 102 is being manufactured, specifically, before bonding of the upwind and downwind shells of the wind blade.

Subsequently, at step 208, creating an access path extending from an outer surface of the elongated structure, opposite to the defined location, using a first tool. Specifically, in one example, at step 208, the first tool is used to access the inner surface of the elongated structure from an outer surface of the elongated structure, opposite to the defined location, thereby forming the access path. When the elongated structure is a wind blade, the first tool enters the inner surface 107 of the wind blade 102 from the outer surface of the wind blade 102. Specifically, the first tool enters the inner surface 107 at the defined location. As noted hereinabove, the flexible layer is disposed at the defined location. In this example, the first tool may be a drilling tool.

Furthermore, at step 210, at least one of the flexible layer, the one or more lines, and the sheath is extracted outside the elongated structure via the access path, using a second tool. Specifically, at least one of the flexible layer, the one or more lines, and the sheath may be pulled out from the enclosed cavity 106 of the wind blade 102. In one example, the flexible layer may be pulled out using the second tool. As a result of pulling out the flexible layer, the one or more lines and the sheath are also pulled out from the enclosed cavity 106 of the wind blade 102.

The steps 208 and 210 are executed subsequent to the manufacture of the wind blade 102. Specifically, the steps 208 and 210 are executed subsequent to closing of the upwind and downwind shell of the wind blade 102. In one embodiment, the steps 208 and 210 may be executed subsequent to the installation of the wind blade 102 on the wind tower.

The steps 202-210 of FIG. 2 may be explained in greater detail with respect to the FIGS. 3-16. Specifically, FIGS. 3-10 describe pre-installation of the cable inside the wind blade 102 before bonding of the upwind and downwind shells of the wind blade 102, as disclosed in steps 202-206 of FIG. 2. More specifically, FIGS. 3-10 describe pre-installation of the cable inside the wind blade 102 during manufacture of the wind blade 102. The term 'during manufacture,' as used herein, refers to a stage when the downwind and upwind shells of the wind blade are open, and the internal surface of the wind blade is easily accessible.

Further, FIGS. 11-16 describe process of extraction of the cable 104 from inner surface of the wind blade 102 to outside the wind blade 102, after manufacture of the wind blade 102, as disclosed in steps 208-210 of FIG. 2. The term 'after manufacture,' as used herein, refers to a stage when the downwind and upwind shells of the wind blades are closed to form an enclosed cavity. In one example, 'after manufacture' may be a stage when the wind blades are installed on the tower. During this stage there is a limited access to the internal surface of the wind blade.

Figure 3:
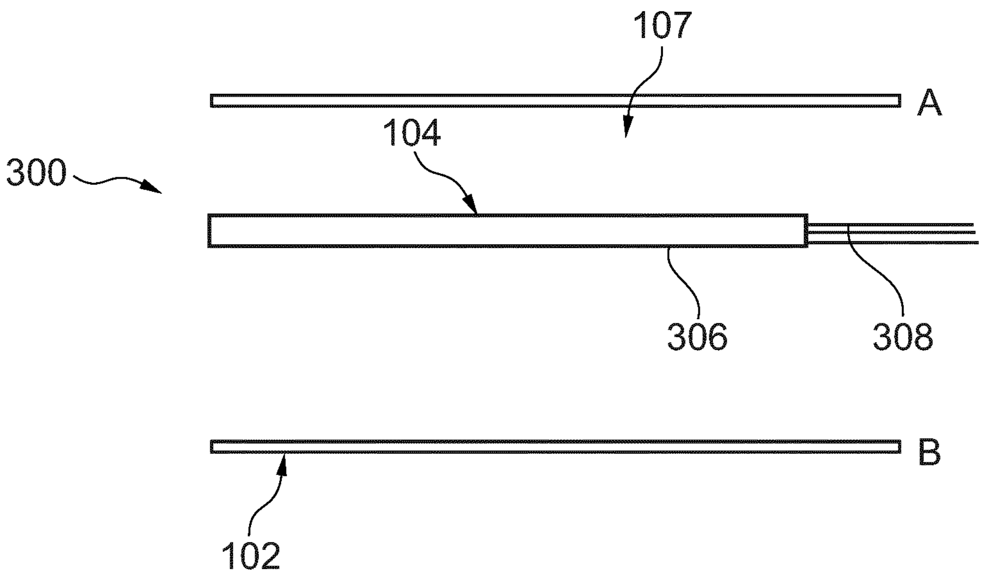
FIGS. 3-4 are diagrammatical representations of different embodiments of a cable disposed along an inner surface of the wind blade as described at least in the steps of FIG. 2.
Figure 4:
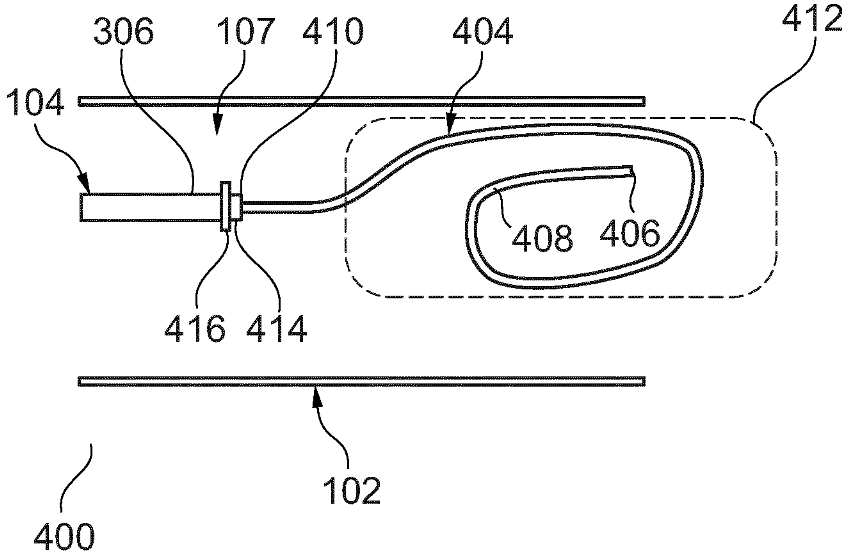

FIGS. 3-4 are diagrammatical representations of different embodiments of a cable disposed along an inner surface of the wind blade as described at least in the steps of FIG. 2. Specifically, FIG. 3 represents a cross sectional view 300 of the wind blade 102 with the cable 104. The cable 104 is disposed along the inner surface 107 of the wind blade 102.

The cable 104 may include one or more lines 308 covered using an outer protection layer 306, such as rubber layer. The outer protection layer 306 may be removed to uncover a determined length of the one or more lines 308. In one example, the cable 104 is a fiber optic cable. In a fiber optic cable the one or more lines 308 may be optical fibers.

FIG. 4 is a diagrammatical representation 400 of the cable disposed along the inner surface of the wind blade. FIG. 4 specifically represents the one or more uncovered lines, such as the lines 308 of FIG. 3, enclosed using a sheath 404. In one embodiment, the sheath 404 is an aramid woven tube. In another embodiment, the sheath 404 includes at least one of a polymer based tube, a glass tube, an aramid tube, or a metal fiber based tube. In one embodiment, the sheath may be partially a metal braid.

The sheath 404 includes three sections. The first section of the sheath 404 extends between point 406 and point 408. The second section of the sheath 404 extends between the point 408 and point 410. The first section of the sheath 404 is empty and does not include the one or more lines. The second section of the sheath 404 includes the one or more lines enclosed in the sheath 404. Additionally, third section 414 of the sheath 404 snugly covers a portion of the cable 104. Further, a clamp 416 aids in clamping the third section 414 of the sheath 404 along with the outer protection layer 306 to the inner surface 107 of the wind blade 102. Accordingly, the sheath 404 is clamped securely to the wind blade 102.

Furthermore, in the example of FIG. 4, a portion of the sheath 404 takes a coiled form. This portion of the sheath 404 is referred to as a coiled structure 412. In another embodiment, this portion of the sheath 404 may not be in the coiled form.

Figure 5:
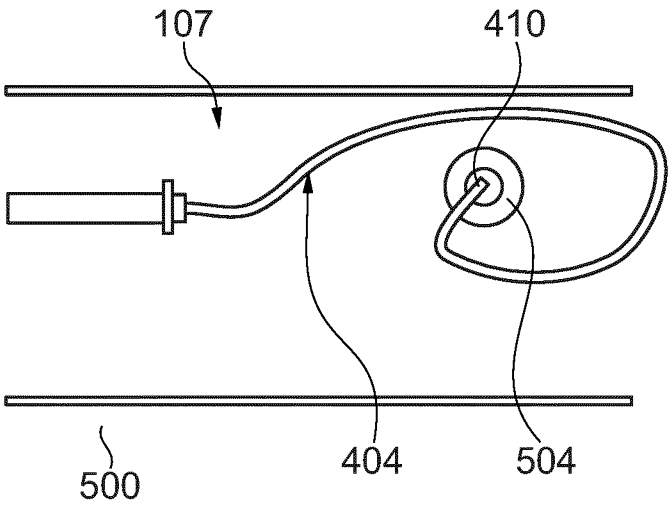
FIG. 5 is a diagrammatical representation of one end of a sheath coupled to a flexible layer as described at least in the steps of FIG. 2.

FIG. 5 is a diagrammatical representation 500 of one end of a sheath coupled to a flexible layer as described at least in the steps of FIG. 2. The point 410 of the sheath 404 is coupled to a flexible layer 504. In one example, the point 410 of the sheath 404 is coupled to the flexible layer 504 using a glue/adhesive. Accordingly, the sheath 404 and the flexible layer 504 are fixedly coupled to one another.

The flexible layer 504 is a flexible tear-resistant layer. In one embodiment, the flexible layer 504 is a fabric made of at least one of a nylon layer, a polyethylene layer, polyurethane layer, a polypropylene layer, silicon layer, a cotton layer, a glass layer, or a metal fabric layer. In the example of FIG. 5, the flexible layer 504 is circular in shape. In another embodiment, the flexible layer 504 may be of any other shape and size.

Figure 6:
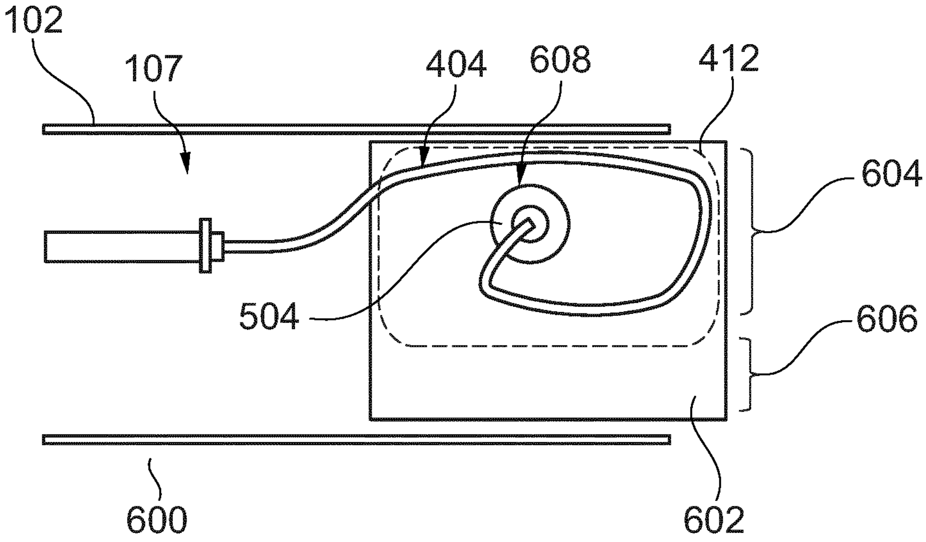
FIGS. 6-8 are diagrammatical representations of different embodiments of a covering sheet disposed about at least the sheath as described at least in the steps of FIG. 2.
Figure 7:
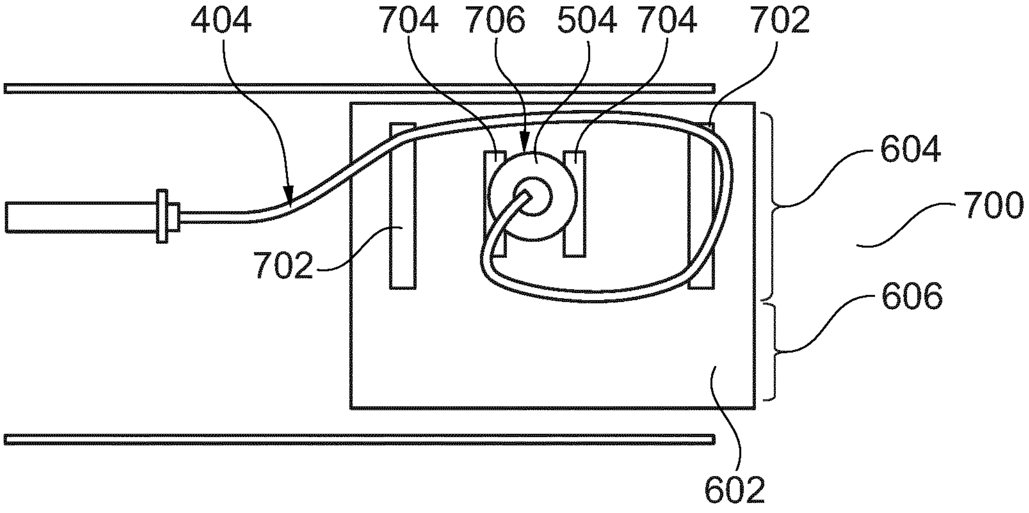
Figure 8:
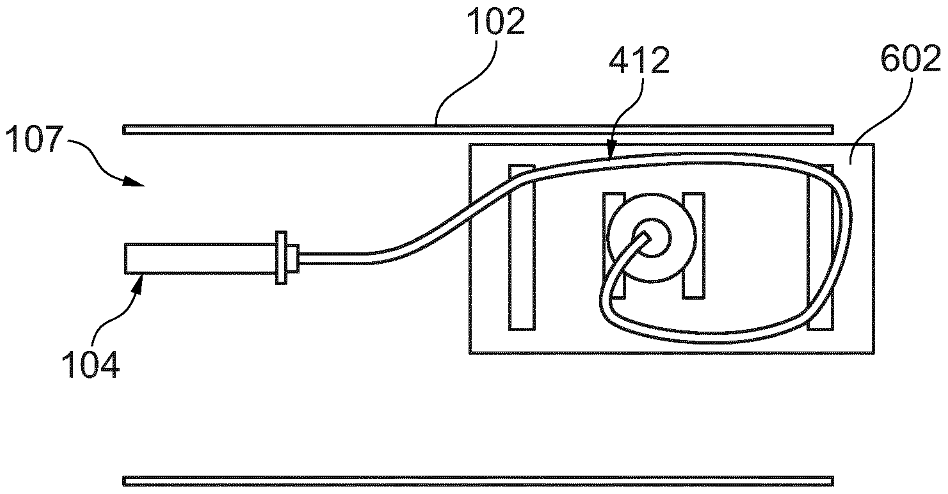

FIGS. 6-8 are diagrammatical representations of different embodiments of a covering sheet disposed on and about at least the sheath as described at least in the steps of FIG. 2. Specifically, FIG. 6 is a diagrammatical representation 600 of the covering sheet disposed below the sheath. More specifically, a covering sheet 602 is placed between a section of the sheath 404 and the inner surface 107 of the wind blade 102, and is in physical contact of the inner surface 107 of the wind blade 102.

In the example of FIG. 6, the covering sheet 602 includes a first portion 604 and a second portion 606. The first portion 604 of the covering sheet 602 is placed adjacent to a section of the sheath. Specifically, the first portion 604 of the covering sheet 602 is placed adjacent to the coiled structure 412 of the sheath 404. The second portion 606 of the covering sheet 602 is disposed away from the sheath 404. In one example, the covering sheet 602 may be made of a polymer. In one specific example, the covering sheet 602 may be a plastic mat.

In one embodiment, the covering sheet 602 does not overlap the flexible layer 504. In such an embodiment, a covering sheet 602 includes an opening 608 such that the opening 608 receives the flexible layer 504. Specifically, the opening 608 is designed in such a manner that the covering sheet 602 is disposed adjacent to the periphery of the flexible layer 504. In another embodiment, the flexible layer may be enclosed by the covering sheet.

FIG. 7 is a diagrammatical representation 700 of coupling of the covering sheet. The covering sheet 602 is coupled to the inner surface 107 of the wind blade 102 using double sided tapes 702. When the covering sheet 602 is coupled to the inner surface 107, the covering sheet 602 is preferably maintained in a straight and wrinkle free position. Further, peripheral region of the flexible layer 504 is coupled to the covering sheet 602 using double sides tapes 704. Accordingly, the flexible layer 504 is disposed at a defined location 706. In one example, instead of the double-sided tapes 702, 704, glue or adhesive may be employed.

Subsequently, as depicted in FIG. 8, the second portion 606 of the covering sheet 602 is folded over the first portion 604 of the covering sheet 602. Accordingly, the covering sheet 602 wraps over the coiled structure 412. Hence, the coiled structure 412 of the sheath 404 is hermetically enclosed in the covering sheet 602. The covering sheet 602 aids in protecting the coiled structure 412 during a closing process of the upwind and downwind shells of the wind blade. As will be appreciated, the inner surface 107 of the wind blade 102 may be exposed to glue while bonding of the upwind and downwind shell of the wind blade. Hence, if the coiled structure 412 is not enclosed in the covering sheet 602, the coiled structure 412 may be undesirably glued to the inner surface 107 of the wind blade 102.

Figure 9:
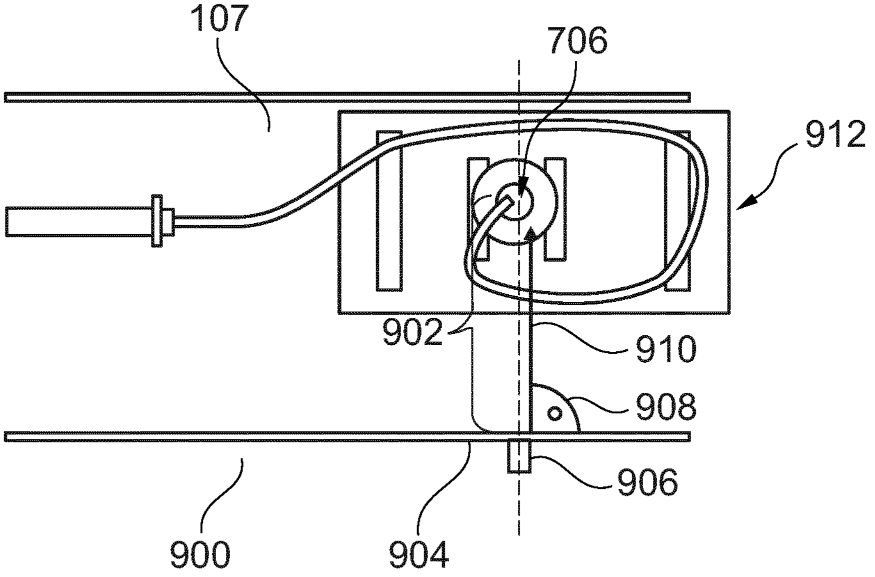
FIG. 9 is a diagrammatical representation of an embodiment of determination of distances and angles from a defined location at the inner surface of the wind blade.
Figure 10:
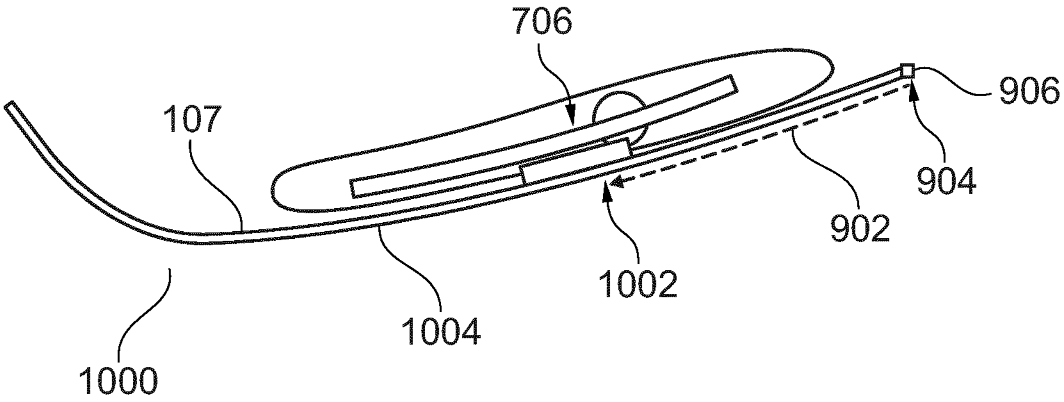
FIG. 10 is a diagrammatical representation of an embodiment of determination of an access point opposite to the defined location for use in the steps of FIG. 2.

FIG. 9 is a diagrammatical representation 900 of an embodiment of determination of distances and angles from a defined location on the inner surface of the wind blade. The determination of distances and angles from the defined location aids to locate an access point on an outer surface 1004 (as shown in FIG. 10) of the wind blade for accessing the flexible layer 504 after closure of the upwind and downwind shell of the wind blade. In the example of FIG. 9, at least one of an arc length of the wind blade and a chord length of the wind blade is determined respectively from the defined location 706. In one example, the arc length of the wind blade and a chord length of the wind blade is determined using a template, such as but not limited to a measuring tape, a thread, or a stick. Once at least one of the arc length and the chord length is determined, it is documented for future reference.

In the example of FIG. 9, a chord length 902 from the defined location to a point on a trailing edge 904 of the wind blade is determined. This point on the trailing edge 904 is referred to as a span location 906. Further, a trailing-edge angle 908 formed between the trailing edge 904 and a line 910 drawn between the defined location 706 and the span location 906 is determined. Further, a marker may be put on the mould flange to identify the span location 906. In one embodiment, the marker extends at least partially on part of the excess laminate. In one example, the markers include at least one of a hot-glue bump and a masking tape. In another embodiment, instead of the chord length, arc length of the wind blade 102 is determined from the defined location 706. In this embodiment, a template, such a thread may be employed to measure the arc length from the defined location 706 to the span location 906.

FIG. 10 is a diagrammatical representation 1000 of an embodiment of determination of an access point opposite to the defined location for use in the steps of FIG. 2. FIG. 10 is another view of the diagrammatical representation 900, specifically when viewed in the direction 912. As noted hereinabove, the chord length 902 and the trailing edge angle 908 is determined and documented. Further, the span location 906 is indicated using a marker. In another embodiment, the span location 906 is indicated based on a distance from a reference location, where the reference location may be a blade root or a joint face of jointed blades from a split mold. In the example of FIG. 10, from the span location 906 on the trailing edge of the wind blade 102, the trailing edge angle 908 and the determined chord length 902 is plotted on the outer surface 1004 of the wind blade 102. Accordingly, the access point 1002 is obtained on the outer surface 1004. The access point 1002 is opposite to the defined location 706.

Figure 11:
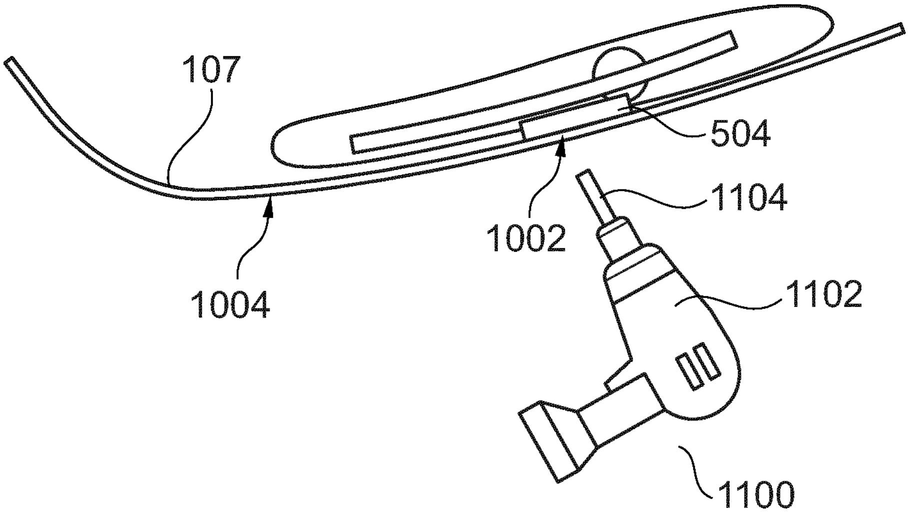
FIG. 11 is a diagrammatical representation of one embodiment of accessing via the wind blade surface as described at least in the steps of FIG. 2.

FIG. 11 is a diagrammatical representation 1100 of one embodiment of accessing via the wind blade surface as described at least in the steps of FIG. 2. Once the access point 1002 is determined as described with respect to FIG. 10, a first tool 1102 is used to access the inner surface 107 of the wind blade from an outer surface 1004 of the wind blade thereby forming an access path. In one example, the first tool 1102 is a drilling tool.

In another example, the first tool may be a screw or a milling tool. It may be noted that an engineer operating the first tool 1102 may halt further accessing using the first tool 1102 when tip 1104 of the first tool 1102 hits the flexible layer 504.

Figure 12:
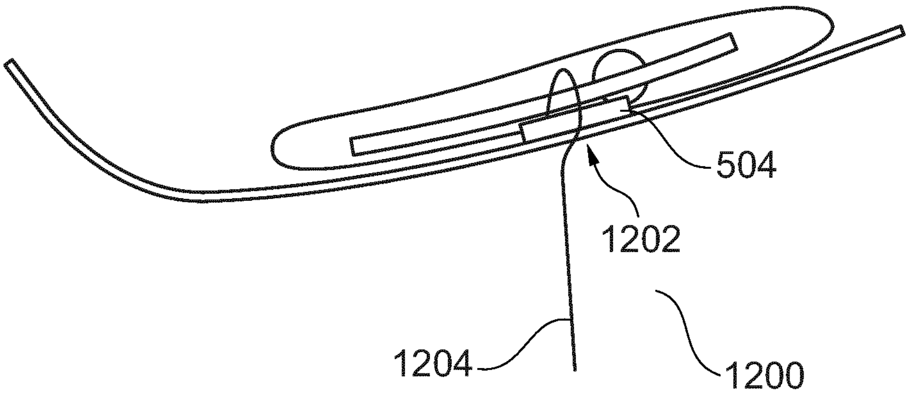
FIGS. 12-14 are diagrammatical representations of extraction of the cable as described at least in the steps of FIG. 2.
Figure 13:
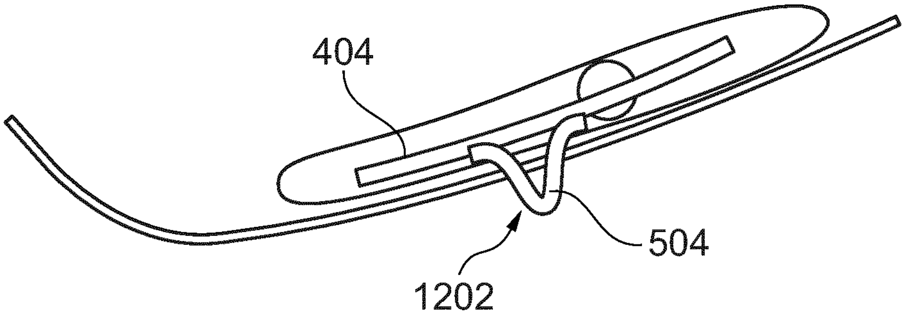
Figure 14:
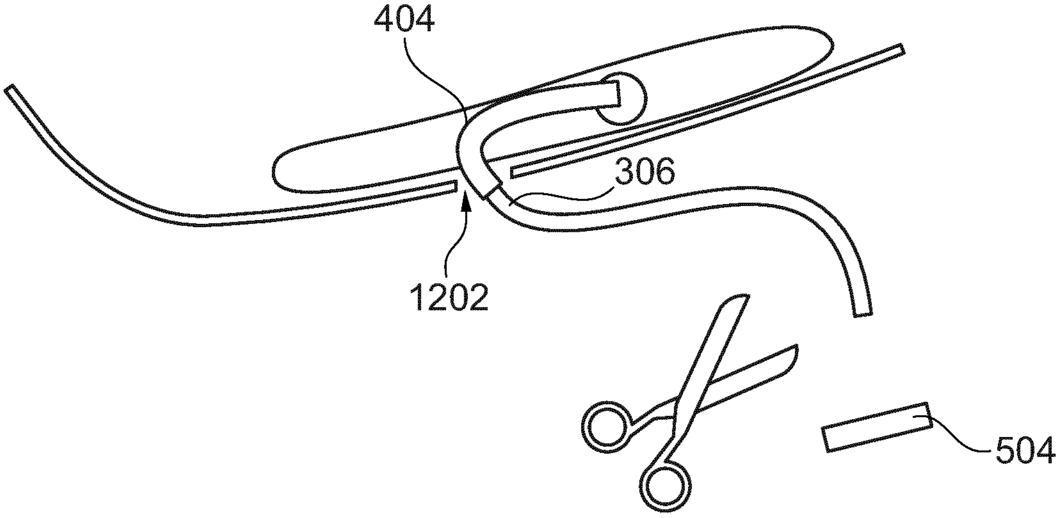

FIGS. 12-14 are diagrammatical representations of extraction of the cable as described at least in the steps of FIG. 2. Specifically, FIG. 12 is a diagrammatical representation 1200 of extracting the flexible layer 504 using a second tool 1204. A second tool 1204 may be introduced via the access path 1202. The second tool 1204 includes at least one of a hook, a slim pair of pliers, pincers, a grabbing tool, and an endoscope. Subsequently, the second tool 1204 clasps the flexible layer 504. Further, the second tool 1204 is pulled outwards, thereby pulling out the flexible layer 504 via the access path 1202 as depicted in FIG. 13. Along with the flexible layer 504, the sheath 404 is pulled out via the access path 1202, as depicted in FIG. 14. The sheath 404 is pulled through the access path 1202 until it is outside of the wind blade where it is uncoiled. Once the sheath 404 is pulled out, the flexible layer 504 is removed. Along with the sheath 404, the one or more lines, such as the lines 308, are also pulled out. Once the one or more lines 308 are pulled out, the sheath 404 covering of the one or more lines 308 is removed from at least a portion of the lines 308 that extend outside the wind blade from the access point 1002.

In another embodiment where the flexible layer is enclosed by the covering sheet, the second tool may clasp the covering sheet. Further, the covering sheet may be pulled out through the access path. As a result, the covering sheet may easily stretch to allow the flexible layer and cable also to pass through the access path along with the covering sheet. Along with the flexible layer, the sheath is also pulled out via the access path.

Figure 15:
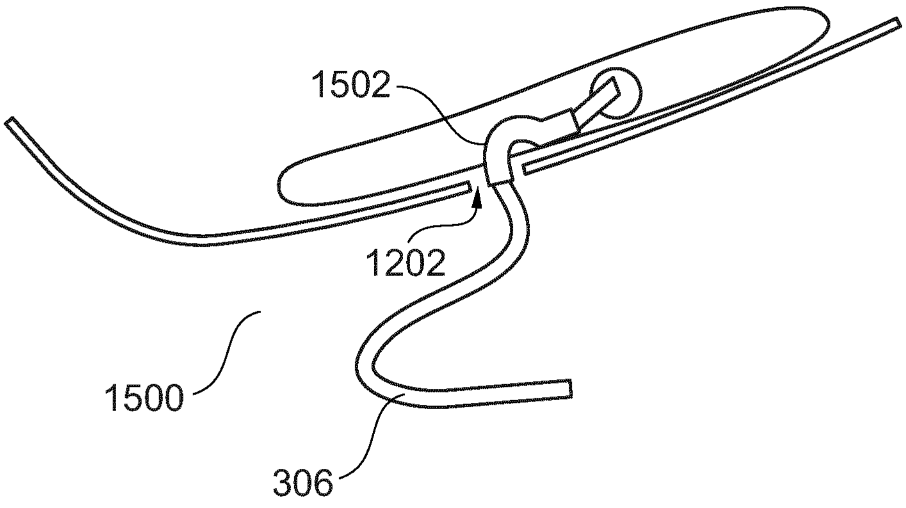
FIG. 15 is a diagrammatical representation of insertion of a protection pipe as described at least in the steps of FIG. 2.

FIG. 15 is a diagrammatical representation 1500 of insertion of a protection pipe as described at least in the steps of FIG. 2. Subsequent to pulling out the one or more lines 308, the one or more lines 308 are routed via a protection pipe 1502. Further, the protection pipe 1502 is pushed along the one or more lines 308 till the protection pipe 1502 enters the enclosed cavity, such as the enclosed cavity 106, of the wind blade via the access path 1202. The use of the protection pipe 1502 at the access path 1202 aids in reducing the stress on the one or more lines 308 around an area proximate to the access path 1202. Further, the use of the protection pipe 1502 at the access path 1202 aids in retaining a minimum radius of curvature of the one or more lines 308. The protection pipe 1502 may be made of elastic, nylon, polyurethane, and the like. In one example, the protection pipe 1502 includes a bent pipe. Specifically, in one example, the protection pipe 1502 may be an L-shaped pipe, a U-shaped pipe and the like.

Figure 16:
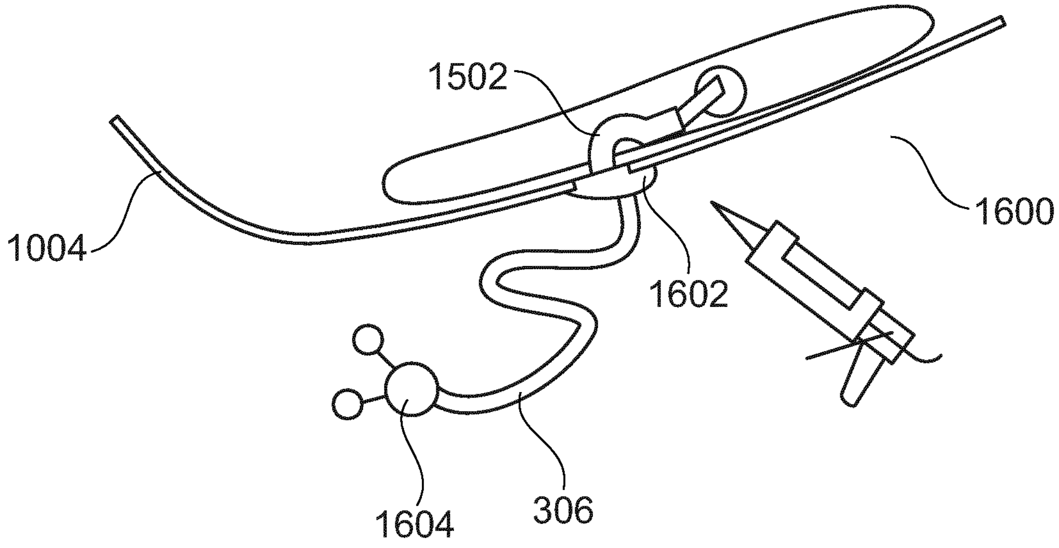
FIG. 16 is a diagrammatical representation of sealing an access path on the wind blade as described in the steps of FIG. 2.

FIG. 16 is a diagrammatical representation 1600 of sealing access path on the wind blade as described in the steps of FIG. 2. Subsequent to the insertion of the protection pipe 1502, the access path 1202 may be sealed using a sealant 1602. Upon sealing the access path 1202 using the sealant 1602, the protection pipe 1502 may also be securely fixed. In one example, the sealant 1602 may be a glue. In another embodiment, the sealant 1602 may be a premade rubber insert. In one embodiment, the access path 1202 may not be sealed.

Further, connector 1604 may be coupled to the end of the extracted one or more lines 308. Subsequently, the sensors may be coupled to the connector 1604. In one embodiment, these sensors may be disposed on the outer surface 1004 of the wind blade.

In accordance with the embodiments discussed herein, a system and a method of installing a cable in an elongated structure, such as wind blade is disclosed. Subsequently, the sensors may be coupled to the installed cable. The proposed arrangement of the cable inside the wind blade aids in easy access of the cable from outer surface of the wind blade. Further, the proposed system and method enable accessing of the cable from the outer surface via a narrow access path on body of the wind blade. Thus, need of large manholes or hatches to access the internally disposed cable is avoided. Although the proposed system and method has been described with respect to installing cables in wind blades, this system and method may find application when cables are installed in other enclosed elongated structures, such as but not limited to long pipelines, aircraft wings, structural tubes, and the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A method of installing a cable in a wind blade, wherein the cable comprises one or more lines, the method comprising:

a) enclosing the one or more lines of the cable using a sheath, wherein a first end of the sheath is secured to an inner surface of the wind blade;

b) coupling a second end of the sheath to a flexible layer;

c) disposing the flexible layer at a defined location at the inner surface of the wind blade;

d) after coupling the second end of the sheath to the flexible layer and disposing the flexible layer at the defined location, creating an access path extending from an outer surface of the wind blade, opposite to the defined location; and e) extracting at least one of the flexible layer, the one or more lines, and the sheath from inside the wind blade via the access path.

2. The method according to claim 1, further comprising laying the cable along the inner surface of the wind blade.

3. The method according to claim 1, further comprising removing an outer protection layer of the cable to uncover the one or more lines.

4. The method according to claim 1, further comprising:

routing the one or more lines via a protection pipe subsequent to extraction of the one or more lines via the access path; and sealing the access path using at least one sealant.

5. The method according to claim 1, further comprising wrapping the sheath using at least one covering sheet.

6. The method according to claim 5, wherein the wrapping of the sheath using the at least one covering sheet comprises disposing at least a first portion of the at least one covering sheet beneath at least a section of the sheath.

7. The method according to claim 6, wherein the disposing of at least the first portion of the at least one covering sheet below at least the section of the sheath comprises adhesively coupling the first portion of the at least one covering sheet to the inner surface of the wind blade using at least of an adhesive, a tape, and a glue.

8. The method according to claim 5, wherein the wrapping of the sheath using the at least one covering sheet comprises folding a second portion of the at least one covering sheet over at least the section of the sheath.

9. The method according to claim 1, further comprising determining at least one of an arc length of the wind blade and a chord length of the wind blade from the defined location.

10. The method according to claim 1, wherein at least the sheath forms a coiled structure proximate to the defined location.

11. The method according to claim 1, further comprising clamping the first end of the sheath to the inner surface of the wind blade.

12. The method according to claim 1, wherein the steps a), b), and c) are executed during manufacture of the wind blade and the steps d) to e) are executed after manufacture of the wind blade.

13. The method according to claim 1, wherein the securing of the sheath to the inner surface of the wind blade comprises releasably attaching the first end of the sheath to the inner surface of the wind blade.

14. The method according to claim 13, wherein the releasable attaching of the first end of the sheath to the inner surface of the wind blade comprises clamping the first end of the sheath to the inner surface of the wind blade.

* * * * *